United States Patent [19]

deNeuf et al.

[11] Patent Number: 5,430,605

[45] Date of Patent: * Jul. 4, 1995

[54] COMPOSITE MULTILAYER CAPACITIVE DEVICE AND METHOD FOR FABRICATING THE SAME

[75] Inventors: Joel B. deNeuf, State College; Bruce E. Helms, Warrior's Mark, both of Pa.

[73] Assignee: Murata Erie North America, Inc., Smyrna, Ga.

[ * ] Notice: The portion of the term of this patent subsequent to Jul. 13, 2010 has been disclaimed.

[21] Appl. No.: 89,219

[22] Filed: Jul. 7, 1993

Related U.S. Application Data

[63] Continuation-in-part of Ser. No. 925,552, Aug. 4, 1992, Pat. No. 5,227,951.

[51] Int. Cl.⁶ .......................... H01G 7/00; H01G 4/12
[52] U.S. Cl. .................... 361/321.1; 29/25.42
[58] Field of Search ............... 361/321.3, 303, 306.1, 361/306.2, 306.3, 321.1; 323/370; 333/184, 185, 172

[56] References Cited

U.S. PATENT DOCUMENTS

| | | | |
|---|---|---|---|
| 3,569,872 | 3/1971 | Berlin | 333/70 |
| 3,619,220 | 11/1971 | Maher | 106/39 |
| 4,814,940 | 3/1989 | Horstmann et al. | 361/309 |
| 4,831,494 | 5/1989 | Arnold | 361/306.3 |
| 4,835,656 | 5/1989 | Kitahara et al. | 361/321 |
| 4,910,638 | 3/1990 | Berghout et al. | 361/321 |
| 4,953,273 | 9/1990 | Insetta et al. | 29/25.42 |
| 5,003,428 | 3/1991 | Shepherd | 361/321 |
| 5,027,253 | 6/1991 | Lauffer et al. | 361/321 |
| 5,034,709 | 7/1991 | Azumi et al. | 333/184 |
| 5,046,236 | 9/1991 | Wada et al. | 29/610.1 |
| 5,072,329 | 12/1991 | Galvagni | 361/321 |
| 5,099,387 | 3/1992 | Kato et al. | 361/321 |
| 5,157,582 | 10/1992 | Sugita et al. | 361/321 |
| 5,159,524 | 10/1992 | Hasegawa et al. | 361/271 |
| 5,227,951 | 7/1993 | deNeuf | 361/321.3 |

FOREIGN PATENT DOCUMENTS

| | | |
|---|---|---|
| 105837 | 12/1973 | Japan . |
| 147266 | 11/1977 | Japan . |
| 82430 | 6/1980 | Japan . |
| 7332 | 1/1981 | Japan . |
| 54029 | 5/1981 | Japan . |
| 70637 | 6/1981 | Japan . |
| 94032 | 7/1981 | Japan . |

(List continued on next page.)

*Primary Examiner*—Bruce A. Reynolds
*Assistant Examiner*—Michael D. Switzer
*Attorney, Agent, or Firm*—Hopkins & Thomas

[57] ABSTRACT

A composite multilayer capacitive device (10) has a series resistance. A capacitor body (14) is defined by a plurality of interleaved first and second ceramic layers (21, 23) having respective first and second electrode patterns (22, 24) which establish a selectable capacitance. In a first embodiment, the first and second electrode patterns (22, 24) are generally rectangular with protruding interconnect elements (27, 28). In a second embodiment, the first and second electrode patterns (62, 64) are similar to those in the first embodiment, except that the second electrode pattern (64) has no interconnect element and is elongated in order to directly contact the second termination (18). In a third embodiment, the first and second electrode patterns (82, 84) are generally rectangular with first, second, and third protruding interconnect elements (87a-87c, 88a-88c). In the first, second, and third embodiments, a first termination (16) is disposed at a first end (33) of the capacitor body (14) and is connected to the first electrode patterns (22, 62, 82) of the first ceramic layers (21, 61, 81) through a lateral resistive layer (12). A second termination (18) is disposed at a second end (36) of the capacitor body (14) and is connected to the second electrode patterns (24, 64, 84) of the second ceramic layers (23, 63, 83). As a result, the lateral resistive layer (12) serves as a series resistance between the first and second terminations (16, 18).

22 Claims, 6 Drawing Sheets

FOREIGN PATENT DOCUMENTS

| | | |
|---|---|---|
| 147424 | 11/1981 | Japan . |
| 39426 | 3/1982 | Japan . |
| 80829 | 5/1982 | Japan . |
| 188820 | 11/1982 | Japan . |
| 27302 | 2/1983 | Japan . |
| 49430 | 4/1983 | Japan . |
| 51439 | 4/1983 | Japan . |
| 119624 | 7/1983 | Japan . |
| 127634 | 8/1983 | Japan . |
| 150825 | 10/1983 | Japan . |
| 210612 | 12/1983 | Japan . |
| 123333 | 8/1984 | Japan . |
| 225509 | 12/1984 | Japan . |
| 140714 | 7/1985 | Japan . |
| 184728 | 11/1987 | Japan . |
| 274702 | 11/1987 | Japan . |
| 90113 | 4/1988 | Japan . |
| 108622 | 7/1988 | Japan . |

COMPOSITE MULTILAYER CAPACITIVE DEVICE AND METHOD FOR FABRICATING THE SAME

RELATED APPLICATION

This document is a continuation-in-part of parent application Ser. No. 07/925,552, filed Aug. 4, 1992, by the same inventors herein entitled "Composite Multilayer Capacitive Device and Method for Fabricating the Same," now U.S. Pat. No. 5,227,951.

BACKGROUND OF THE INVENTION

I. Technical Field

The present invention generally relates to discrete electronic circuit elements, and more particularly, to a composite multilayer capacitive device fabricated via multilayer ceramic (MLC) technology.

II. Related Art

For many years, the fabrication of discrete electronic multilayer capacitors has remained much the same. Generally, layers of conductive metallic electrodes are interleaved with layers of a dielectric ceramic material to form the main capacitor body of a multilayer ceramic capacitor. A termination, or a conductive contact, is disposed at each end of the capacitor body. Moreover, each termination is connected to an exclusive set of alternate electrodes. In effect, the capacitor body responds like a group of capacitors connected in electrical parallel. The parallel connection is effectuated by the common termination interfacing alternate electrodes. The degree of capacitance achieved is a function of the number of interleaved layers, the geometric area of each electrode, and the dielectric constant and thickness of the ceramic layers.

The historical fabrication of multilayer ceramic capacitors and some of the most recently developed methods for manufacturing the same are described in, for example, Wada et al. U.S. Pat. No. 5,046,236 and Kitahara U.S. Pat. No. 4,835,656, both of which are incorporated herein by reference as if set forth in full hereinafter. In general, the fabrication of the capacitor body is a lamination process. A ceramic sheet is obtained in green form. A thick film of a metallic electrode paste is screen printed on the ceramic sheet. Next, the ceramic sheets are stacked, pressed, cut, and then sintered in a kiln. Finally, the terminations are disposed at each end of the capacitor body by a conventional dipping process wherein the capacitor body is dipped into a liquified metallic solution, such as silver, and then sintered in a kiln. Afterwards, the terminations may be plated by one or more other metallic layers, such as a nickel and/or tin plating layer, if desired.

To further enhance the quality of multilayer ceramic capacitors, Berghout et al. U.S. Pat. No. 4,910,638 teaches the implementation of a conductive barrier layer between the capacitor body and the terminations so as to prevent undesirable diffusion of silver from the terminations into the electrodes. Furthermore, Galvagni U.S. Pat. No. 5,072,329 describes a method for multilayer ceramic capacitor fabrication which results in a capacitor resistant to undesirable delamination.

Because multilayer ceramic technology is inexpensive and can be utilized easily for mass production, attempts have been made to incorporate other circuit elements with capacitors using the multilayer ceramic technology. In the art, inductors and capacitors have been laminated alternately to form a single composite device whereby a filter function (high frequency noise absorption function) is obtained. Another composite electronic component is described in Azumi et al. U.S. Pat. No. 5,034,709. In Azumi, a varistor and filter function are implemented in a single composite electronic component using multilayer ceramic technology.

Oftentimes, a need exists in the electronic and computer fields for a series connection of a capacitor and resistor. A series connection of a capacitor and a resistor is required, for example, for matching bus impedances, for data bus terminators adapted to minimize reflections in computer architectures, for digital-to-analog (D/A) and analog-to-digital (A/D) interface circuits, and for central processing unit (CPU) circuits. However, to date, neither prominent researchers nor manufacturers in the art have developed or suggested a technique for fabricating a series connection of a capacitor and a resistor in a single composite electronic component using multilayer ceramic technology. It is known that some manufacturers have created a series connection between a capacitor and a resistor in a unitary device by fabricating a distinct resistor with two terminations adjacent to a distinct capacitor with two other terminations, and then the circuit elements are coupled via connecting a termination from each. Another known technique involves bonding a thick film resistor to an existing capacitor body. However, such configurations are undesirable in that they are costly, occupy valuable space, and can be unreliable due to the increased number of electrical connections (e.g., solder joints).

SUMMARY OF THE INVENTION

Broadly stated, the present invention teaches a composite multilayer capacitive device with a series resistance and a method for fabricating the same. In the novel device, a capacitor body is defined by a plurality of interleaved first and second ceramic layers having respective first and second electrode patterns which establish a selectable capacitance. First and second terminations are disposed at corresponding first and second ends of the capacitor body and are connected to the respective first and second electrode patterns. Significantly, however, the first termination is connected to the first electrode patterns of the first ceramic layers through a resistance means for establishing a selectable resistance in electrical series with the selectable capacitance.

In a first embodiment of the present invention, the first and second electrode patterns are configured similarly in that each comprises a substantially rectangular configuration having a protruding interconnect element. The resistance means comprises a lateral resistive layer which is transversely engaged with the protruding interconnect elements of the first electrode patterns and also with the first termination. Moreover, a lateral conductive layer is transversely engaged with the protruding interconnect elements of the second electrode patterns and also with the second termination. In essence, the lateral conductive layer serves as an interface between the second termination and the second electrode patterns.

In a second embodiment of the present invention, the resistance means comprises a lateral resistive layer which is transversely engaged with the first electrode patterns of the first ceramic layers and also with the first termination. In order to provide the electrical connection between the first electrode patterns and the lateral resistive layer, the first electrode patterns are configured in the form of a substantially rectangular configuration with a protruding interconnect element adapted to engage the lateral resistive layer at the edge of the first ceramic layers. Furthermore, the second electrode patterns are comprised of a substantially rectangular configuration having an edge engaged directly with the said second termination for establishing an electrical connection therebetween.

In a third embodiment of the present invention, the resistance means comprises a lateral resistive layer which is transversely engaged with the first electrode patterns and also with the first termination. In order to provide the electrical connection between the first electrode patterns and the lateral resistor layer, the first electrode patterns are configured in the form of a substantially rectangular configuration with first and second interconnect elements protruding from one side at opposing ends of the one side and a third interconnect element protruding from essentially the midsection of the side which is opposite to the one side. The lateral resistive layer is engaged with the first termination and with the third protruding interconnect element of the first electrode patterns to thereby connect the first electrode patterns to the first termination. Furthermore, in the third embodiment, in order to provide the electrical connection between the second electrode patterns and the second termination, a lateral conductive layer is engaged with the second termination and with the first protruding interconnect elements of the second electrode patterns. Finally, the lateral conductive layer is disposed on the same side of the device as the lateral resistive layer.

The present invention also provides a novel method for providing a series resistance in a composite multilayer capacitive device. The method comprises the following steps. A capacitor body having a definable capacitance is formed by interleaving first and second ceramic layers having respective first and second electrode patterns. First and second terminations are disposed on the capacitor body. During the fabrication process, a lateral resistive layer is transversely engaged with the first electrode patterns and the first termination to thereby ultimately establish a connection therebetween and to thereby ultimately produce a series resistance between the first and second terminations. Further, the second termination is disposed so that it is connected to the second electrode patterns of the second ceramic layers. Accordingly, the device exhibits both a capacitance and resistance in series between the first and second terminations. Also worth noting is that the formulation or geometric area of the lateral resistive layer may be selectively varied to thereby vary the series resistance.

Therefore, it is an object of the present invention to provide a composite multilayer capacitive device and method having a series resistance.

Another object of the present invention is to provide a composite multilayer capacitive device with a series resistance which is reliable in function, durable in structure, and efficient in operation.

Another object of the present invention is to provide a composite multilayer capacitive device with a series resistance which occupies very little space.

Another object of the present invention is to provide a composite multilayer capacitive device with a series resistance which is inexpensive and easy to manufacture.

Other objects, features, and advantages of the present invention will become apparent from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENTS

Figures 1A, 1B:
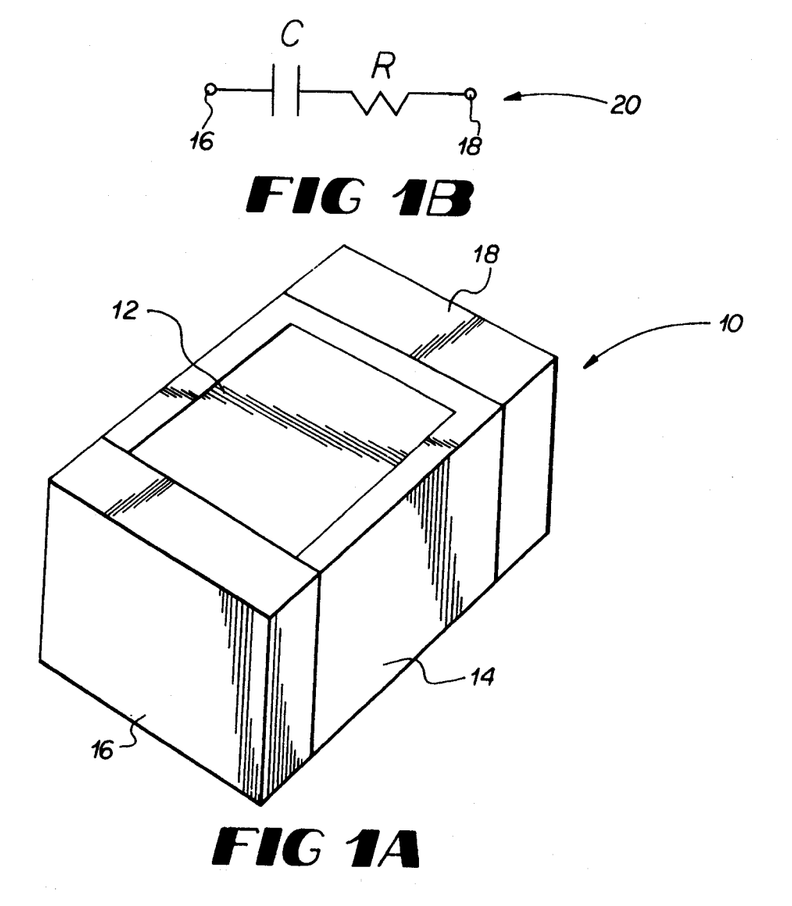
FIG. 1A is a perspective view of the present invention.
FIG. 1B is an electronic circuit model for the present invention of FIG. 1A.

A composite multilayer capacitive device 10 in accordance with the present invention is shown in FIG. 1A. As illustrated in FIG. 1A, a lateral resistive layer 12 is provided in combination with a capacitor body 14 between a termination 16 and a termination 18. The lateral resistive layer 12 is uniquely interfaced with internal electrode patterns of the capacitor body 14, which interfacing will be described in greater detail with respect to FIG. 2 hereinafter. Significantly, the composite multilayer capacitive device 10 exhibits the electrical characteristics as indicated by the electronic circuit model 20 of FIG. 1B. The capacitor body 14 provides the series capacitance C, while the lateral resistive layer 12 provides the series resistance R.

The composite multilayer capacitive device 10 shown in FIG. 1A can be fabricated in many sizes. As a mere example, in one specific implementation, the composite multilayer capacitive device was fabricated to measure approximately $0.125 \times 0.050 \times 0.060$ inches (i.e., industry standard 1206 body style). However, much smaller and much larger implementations are envisioned and are technically possible. Moreover, the composite multilayer capacitive device 10 can be inexpensively fabricated to provide capacitances in at least the range from about 0–1000 picofarads (pF) and resistances in at least the range from about 0–1 megohm, thereby making the device 10 desirable in a wide variety of electronic circuit applications. As with the size parameters, the foregoing capacitance and resistance ranges should not be construed as limiting the present invention, because much greater capacitances and resistances are technically possible and are envisioned.

Figure 2:
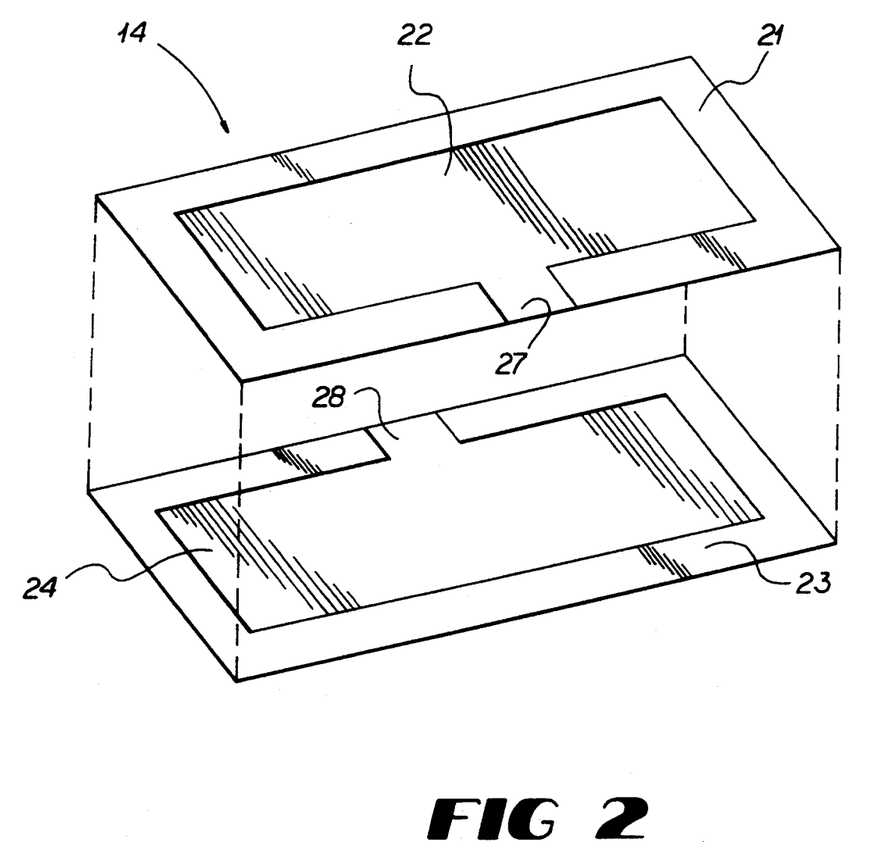
FIG. 2 is a perspective view showing interleaved electrode patterns in accordance with a first embodiment of the present invention.

The capacitor body 14 is defined by a plurality of interleaved first and second ceramic layers having respective first and second electrode patterns. FIG. 2 illustrates the interleaved electrode patterns in accordance with a first embodiment of the present invention. A first ceramic layer 21 has a first electrode pattern 22, comprising a suitable metal, metal alloy, or other conductor material. A second ceramic layer 23 has a second electrode pattern 24, comprising a suitable metal, metal alloy, or other conductor material. As shown by phantom lines, the first ceramic layer 21 and the second ceramic layer 23 are stacked and bonded together using conventional lamination techniques as discussed previously. Any number of first and second ceramic layers 21, 23 can be interleaved to derive virtually any desired capacitance. The degree of capacitance achieved is a function of (1) the number of interleaved ceramic layers 21, 23, (2) the geometric area of each electrode pattern 22, 24, and (3) the dielectric constant and thickness of the ceramic layers 21, 23.

In accordance with a significant aspect of the first embodiment, the first and second electrode patterns 22, 24 each comprise a substantially rectangular configuration having a respective protruding interconnect element 27, 28, one of which is adapted to physically engage the lateral resistive layer 12 of FIG. 1A to thereby establish an electrical connection therewith. The other protruding interconnect element 28, 27 physically engages a lateral conductive layer, discussed in more detail hereinafter, for establishing an electrical connection between the corresponding electrode pattern 24, 22 and one of the terminations 16, 18. As is obvious from FIG. 2, the first ceramic layer 21 having the first electrode pattern 22 can be manufactured substantially identical to the second ceramic layer 23 having the second electrode pattern 24 in order to enhance the cost effectiveness of the fabrication process for the resistive portion of the capacitive device.

Figure 3:
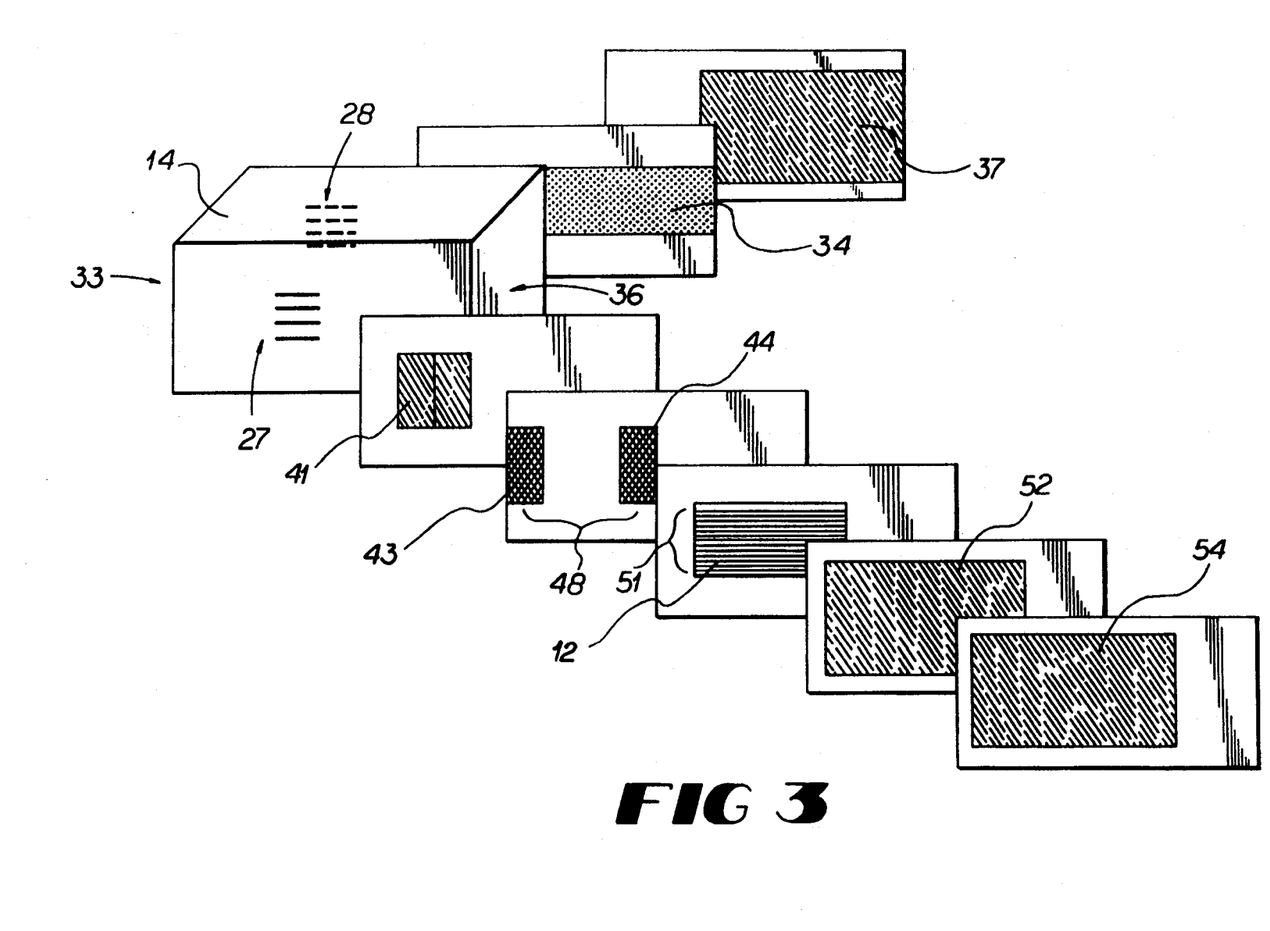
FIG. 3 is a perspective view illustrating fabrication of the first embodiment of FIG. 2.

After the capacitor body 14 has been fabricated, a series of layers are screen printed to two transverse surfaces of the capacitor body 14, as shown in FIG. 3. As an example for purposes of discussion relative to FIG. 3, the protruding interconnect elements 27 of the first electrode patterns 22 in the capacitor body 14 are shown in FIG. 3 ultimately engaged with the lateral resistive layer 12. This lateral resistive layer 12 establishes an electrical connection between the first electrode patterns 22 and the first termination 16, which is ultimately disposed at capacitor body end 33. Further, pursuant to this example, the protruding interconnect elements 28 of the second electrode patterns 24, shown by phantom lines, engage a lateral screened conductive layer 34 which establishes an electrical connection between the second electrode patterns 24 and the second termination 18, which is ultimately disposed at capacitor body end 36. The lateral conductive layer 34 is insulated by screening a dielectric outer layer 37, for example, glass (SiO$_2$) or a similar insulating substance, over the lateral conductive layer 34.

In order to dispose the lateral resistive layer 12 on the capacitor body 14 to achieve the desired electrical configuration, a dielectric glaze pad 41 is initially positioned to cover a region from near the capacitor body end 33 to near the protruding interconnect elements 27, as illustrated in FIG. 3. Conductive metallic materials 43, 44 are then disposed at and slightly over opposing ends of the dielectric glaze pad 41, as shown. The conductive metallic material 43 serves as an electrical interconnect between the first termination 16 and the lateral resistive layer 12. The conductive metallic material 44 serves as an electrical interconnect between the protruding interconnect elements 27 and the lateral resistive layer 12. Next, the lateral resistive layer 12 is positioned over the conductive metallic material 43, the dielectric glaze pad 41, and the conductive metallic material 44, so that the lateral resistive layer 12 serves as the electrical connection between the material 43 and the material 44. Essentially, the dielectric glaze pad 41 insulates the lateral resistive layer 12 from the capacitor body 14 and prevents the resistive layer 12 from having an adverse diffusive reaction with the ceramic capacitor body 14.

In the preferred embodiments, the lateral resistive layer 12 is made of ruthenium oxide (RuO$_2$) material, which is well known in the art. The series resistance R provided by the lateral resistive layer 12 is completely selectable. More specifically, the portion of the lateral resistive layer 12 which overlies the conductive metallic materials 43, 44 is essentially shorted out and consequently, contributes virtually nothing to the series resistance R. The ultimate series resistance R exhibited between the capacitor body faces 33, 36 is defined by (1) the gap 48 between the conductive metallic materials 43, 44, (2) the width 51 of the lateral resistive layer 12, (3) the thickness of the lateral resistive layer 12, and (4) the resistivity of the lateral resistive layer 12. All of the foregoing parameters may be manipulated to achieve virtually any desired series resistance R. Preferably, in order to manipulate the series resistance R, the physical parameters (i.e., gap 48, width 51, resistance layer thickness) of the lateral resistive layer 12 remain fixed while the resistivity is manipulated by changing the formulation of the ruthenium oxide resistive material.

The lateral resistive layer 12 is insulated by superimposing, via preferably screening, two dielectric outer layers 52, 54. The dielectric outer layers 52, 54 are any suitable dielectric material, for example, glass or a similar insulating substance.

Finally, the terminations 16, 18 are disposed at the capacitor body faces 33, 36, respectively, via any conventional process. In the preferred embodiment, the terminations 16, 18 are applied through a dipping operation. Further, nickel plating and then tin plating is provided to enhance product durability in soldering operations.

Figure 4:
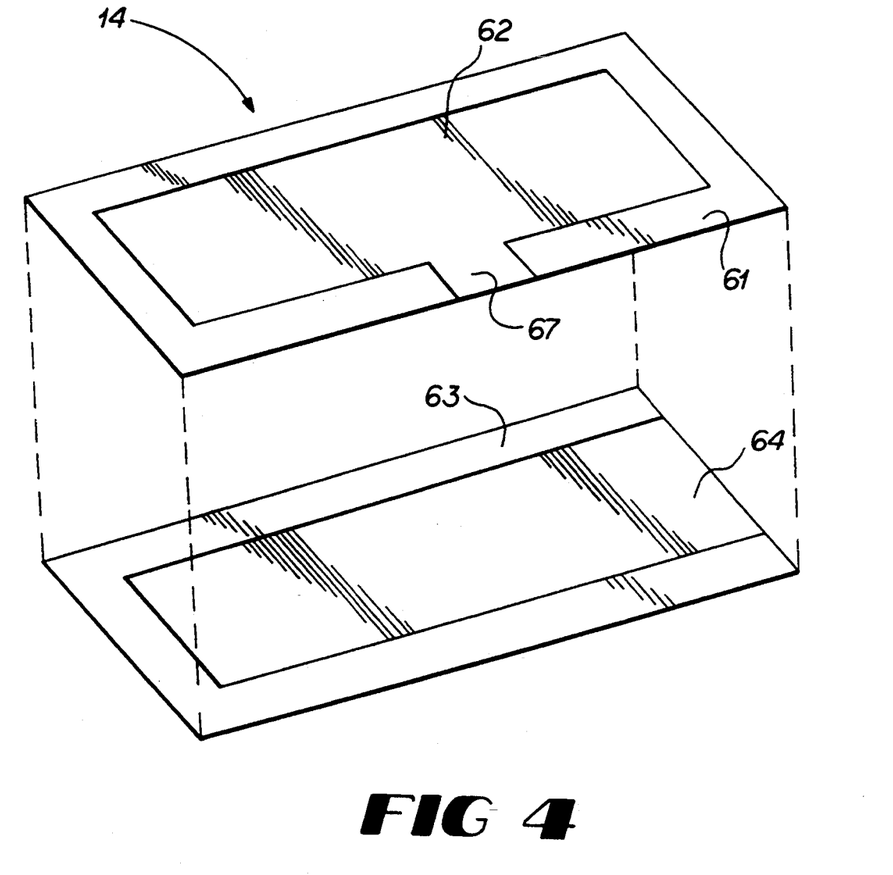
FIG. 4 is a perspective view showing the interleaved electrode patterns in accordance with a second embodiment of the present invention.

A second embodiment of the present invention requires interleaving different types of electrode patterns within the capacitor body 14, as illustrated in FIG. 4. Referring to FIG. 4, a first ceramic layer 61 having a first electrode pattern 62 with a protruding interconnect element 67 is interleaved with a second ceramic layer 63 having a second electrode pattern 64 with no protruding interconnect element. In accordance with the second embodiment, the second electrode pattern 64 is formed in a substantially rectangular configuration and is oriented on the ceramic layer 63 so that an edge of the second electrode pattern physically engages the second termination 18, thereby establishing an electrical connection therebetween. The second embodiment eliminates the need of implementing the lateral conductive layer 34. However, the second embodiment may be more expensive to fabricate as a result of varying first and second electrode patterns 62, 64. In other words, the asymmetrical capacitor body configuration requires additional processing steps for orientation of the capacitor body 14 prior to screening operations.

Figure 5:
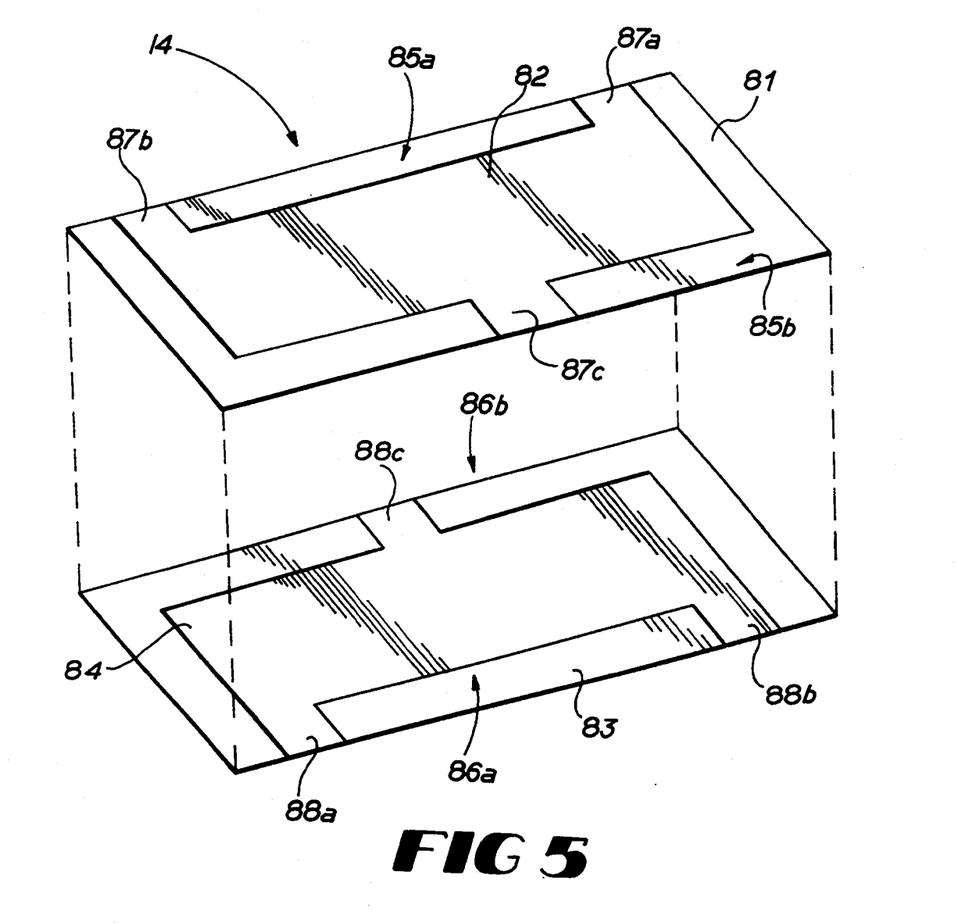
FIG. 5 is a perspective view showing interleaved electrode patterns in accordance with a third embodiment of the present invention.
Figure 6:
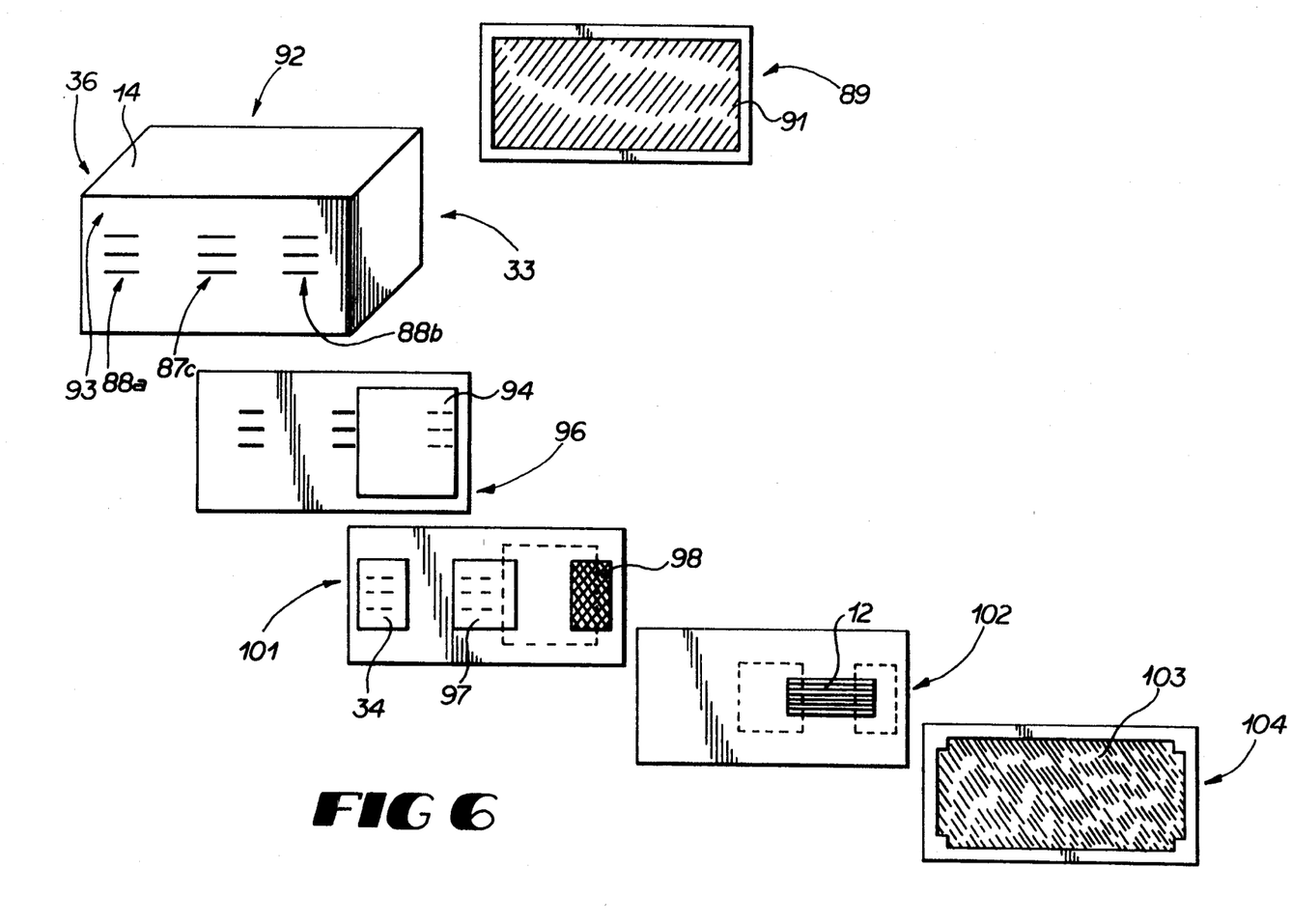
FIG. 6 is a perspective view illustrating fabrication of the third embodiment of FIG. 5.

A third embodiment of the present invention is illustrated in FIGS. 5 and 6. As shown in FIG. 5, the capacitor body 14 comprises a plurality of interleaved ceramic layers 81, 83 having respective electrode patterns 82, 84. The electrode patterns 82, 84 are both substantially rectangular and each comprises a first interconnect element 87a, 88a, a second interconnect element 87b, 88b, and a third interconnect element 87c, 88c. On each electrode pattern 82, 84, the first and second interconnect elements protrude from one side 85a, 86a, and the third interconnect element 87c, 88c protrudes from essentially the midsection of a side 85b, 86b which is opposite to the one side 85a, 86a. Any number of first and second ceramic layers 81, 83 can be interleaved to derive virtually any desired capacitance. As is obvious from FIG. 5, the first ceramic layers 81 having the first electrode patterns 82 can be manufactured substantially identical to the second ceramic layers 83 having the second electrode patterns 84 in order to enhance the cost effectiveness of the fabrication process for the capacitive device 10.

After the capacitor body 14 has been fabricated, a series of layers are screen printed to two transverse surfaces of the capacitor body 14, as illustrated in and as will be described relative to FIG. 6. In the third embodiment, the protruding interconnect elements 87c of the capacitor body 14 are ultimately engaged with the lateral resistive layer 12 which establishes an electrical connection between the first electrode patterns 82 and the first termination 16 which is ultimately disposed at capacitor body end 33. Further, the protruding interconnect elements 88a engage a lateral conductive layer 34 which establishes an electrical connection between the second electrode patterns 84 and the second termination 18 which is ultimately disposed at capacitor body end 36.

Referring to FIG. 6, one or more (preferably, two) dielectric overglaze layers 91, for example, glass or a similar insulating substance, are screened onto lateral surface 92 of the capacitor body 14, thereby insulating that surface of the body 14 and specifically the interconnect elements 87a, 87b, 88c. On the opposing lateral surface 93, one or more (preferably, two) dielectric underglaze layers 94, for instance, glass or a similar insulating substance, are screened over the second interconnect elements 88b, which are shown by phantom lines at reference numeral 96. After the dielectric underglaze layers 94 have been applied to the body 14, the lateral conductive layer 34 as well as two other metallic layers 97, 98 are screened onto the lateral surface 93 of the body 14, as shown at the reference numeral 101. The lateral conductive layer 34 and the metallic layers 97, 98 are preferably silver (Ag). Moreover, the lateral conductive layer 34 and the metallic layer 97 are disposed over the interconnect elements 88a and 87c, respectively. Significantly, the lateral conductive layer 34 is disposed for connecting the protruding interconnect elements 88a to the second terminal 18 which is ultimately disposed at capacitor body end 36.

As indicated at reference numeral 102, the lateral resistive layer 12 is next screened onto the lateral surface 93 of body 14 so that it engages the underlying metallic layers 97, 98, as indicated in phantom lines. In essence, the lateral resistive layer 12 connects the protruding interconnect elements 87c of the first electrode patterns 82 to the first termination 16 via the metallic layers 97, 98. The dielectric underglaze layers 94 insulate the lateral resistive layer 12 from the protruding interconnect elements 88b. Finally, one or more (preferably, two) dielectric overglaze layers 103, as indicated at reference numeral 104, are screened over the lateral surface 93 of body 14 for insulation purposes. Small portions of pads 34, 98 remain exposed to allow connection of terminations 18, 16. The overglaze layers 103 can be, for example, glass or a similar insulating substance.

The third embodiment has several advantages. Because the first and second ceramic layers 81, 83 are substantially the same, separate processes need not be implemented to fabricate each of the layers 81, 83, thereby reducing cost in fabricating the layers as well as in interleaving them to form the body 14. Furthermore, it can be seen by comparing the process of FIG. 3 with that of FIG. 6 that in the third embodiment the lateral conductive layer 34 and the lateral resistive layer 12 may be disposed on the capacitor body 14 with better ultimate quality. Specifically, in the third embodiment, the number of screening processes which must occur after disposing the lateral conductive layer 34 and the lateral resistive layer 12 is minimized. In other words, the third embodiment reduces the number of subsequent firing processes in which the conductive and resistive layers 12, 34 must endure.

It should be understood that, aside from those shown herein, many other configurations and orientations for the electrode patterns 22, 24; 62, 64; 82, 84 of the first, second, and third embodiments are possible so long as the desired functionality is achieved. For example, the protruding interconnect elements 27, 28; 67; 87a–87c, 88a–88c could be positioned anywhere along the edges of their corresponding ceramic layers. Moreover, the substantially rectangular bodies associated with the first and second electrode patterns 22, 24; 62, 64; 82, 84 may take another geometric configuration, such as square, circular, elliptical, triangular, octagonal, serpentine, etc. As a further example, the electrode pattern 64 of the second embodiment in FIG. 4 may be fabricated in the form of a plurality of strips, each having an edge for engaging the second termination 18.

It will be obvious to those skilled in the art that many other variations may be made to the preferred embodiments described above without departing from the novel teachings of the present invention. All such variations are intended to be incorporated herein and within the scope of the present invention, as set forth in the following claims.

Wherefore, the inventors claim the following:

1. A composite multilayer capacitive device having a series resistance, comprising:
   a capacitor body having a plurality of interleaved first and second ceramic layers having respective first and second electrode patterns, each of said first and second electrode patterns comprising a substantially rectangular configuration having first and second interconnect elements protruding from one side and a third interconnect element protruding from a side which is opposite to said one side;
   first and second terminations disposed on said capacitor body;
   a lateral resistive layer engaged with said first termination and with said third protruding interconnect elements of said first electrode patterns to thereby connect said first electrode patterns to said first termination; and
   a lateral conductive layer engaged with said second termination and with said first protruding interconnect elements of said second electrode patterns to thereby connect said second electrode patterns to said second termination.

2. The device of claim 1, wherein the geometric configurations of said first and second electrode patterns are generally the same and wherein said first and second electrode patterns are interleaved together so that said third interconnect elements of said first electrode protrude in essentially the opposite direction relative to said third interconnect elements of said second electrode patterns.

3. The device of claim 1, wherein said first and second interconnect elements protrude at essentially opposing ends of said one side and said third interconnect element protrudes from essentially the midsection of said side which is opposite to said one side.

4. The device of claim 1, further comprising a lateral insulative layer interposed between said lateral resistive element and said second interconnect elements of said second electrode patterns.

5. The device of claim 1, wherein the capacitance exhibited between said first and second terminations measures between 0 and 1000 picofarads and said series resistance exhibited between said first and second terminations measures between 0 and 1 megohm.

6. The device of claim 1, wherein said lateral resistance layer comprises ruthenium oxide material.

7. The device of claim 1 measuring approximately 0.125×0.050×0.060 inches.

8. A composite multilayer capacitive device having a series resistance, comprising:
a capacitor body having a plurality of sides and a plurality of interleaved first and second ceramic layers having respective first and second electrode patterns, each of said first and second electrode patterns comprising a substantially rectangular configuration having first and second interconnect elements protruding from one side at opposing ends of said one side and a third interconnect element protruding from essentially the midsection of a side which is opposite to said one side;
first and second terminations disposed on essentially opposing sides of said capacitor body;
a lateral resistive layer engaged with said first termination and with said third protruding interconnect elements of said first electrode patterns to thereby connect said first electrode patterns to said first termination;
a lateral conductive layer engaged with said second termination and with said first protruding interconnect elements of said second electrode patterns to thereby connect said second electrode patterns to said second termination; and
a lateral insulative layer interposed between said lateral resistive element and said second interconnect elements of said second electrode patterns.

9. The device of claim 8, wherein the spatial configurations of said first and second electrodes are generally the same and wherein said first and second electrode patterns are interleaved together so that said third interconnect elements of said first electrode patterns protrude in essentially the opposite direction relative to said third interconnect elements of said second electrode patterns.

10. The device of claim 8, wherein the capacitance exhibited between said first and second terminations measures between 0 and 1000 picofarads and said series resistance exhibited between said first and second terminations measures between 0 and 1 megohm.

11. The device of claim 8, wherein said lateral resistance layer comprises ruthenium oxide material.

12. The device of claim 1 measuring approximately 0.125×0.050×0.060 inches.

13. A composite multilayer capacitive device having a series resistance, comprising:
a capacitor body having a plurality of sides and having a plurality of interleaved first and second ceramic layers having respective first and second electrode patterns, said first electrode pattern comprising at least a first protruding interconnect element and said second electrode pattern comprising at least a second protruding interconnect element;
first and second terminations disposed on said capacitor body;
a lateral resistive layer engaged with said first termination and with said first protruding interconnect elements to thereby connect said first electrode patterns to said first termination;
a lateral conductive layer engaged with said second termination and with said second protruding interconnect elements to thereby connect said second electrode patterns to said second termination; and
wherein said lateral conductive layer and said lateral resistive layer reside on essentially the same side of said capacitor body.

14. The device of claim 13, wherein:
said first and second electrode patterns are generally identical in spatial configuration;
said first and second electrode patterns each comprise a substantially rectangular configuration having two interconnect elements protruding from one side at opposing ends of said one side and another interconnect element protruding from essentially the midsection of a side which is opposite to said one side; and
said first and second electrode patterns are interleaved together so that said third interconnect elements of said first electrode patterns protrude in essentially the opposite direction relative to said third interconnect elements of said second electrode patterns.

15. The device of claim 13, wherein the spatial configurations of said first and second electrode patterns are generally same.

16. The device of claim 13, further comprising a lateral insulative layer interposed between said lateral resistive element and said second interconnect elements of said second electrode patterns.

17. The device of claim 13, wherein the capacitance exhibited between said first and second terminations measures between 0 and 1000 picofarads and said series resistance exhibited between said first and second terminations measures between 0 and 1 megohm.

18. The device of claim 13, wherein said lateral resistance layer comprises ruthenium oxide material.

19. The device of claim 13 measuring approximately 0.125×0,050×0.060 inches.

20. The device of claim 14, wherein said first and second interconnect elements protrude at essentially opposing ends of said one side and said third interconnect element protrudes from essentially the midsection of said side which is opposite to said one side.

21. A method for providing a series resistance in a composite multilayer capacitive device, comprising the steps of:
producing first and second electrode patterns on respective first and second ceramic layers, each of said electrode patterns having a substantially rectangular configuration with at least first and second protruding interconnect elements;

forming a capacitor body having a plurality of sides by interleaving said first and second ceramic layers;

disposing a lateral resistive layer on a side of said capacitor body so that said lateral resistive layer engages said first protruding interconnect elements of said first electrode patterns;

disposing a lateral conductive layer on said side of said capacitor body so that said lateral conductive layer engages said second protruding interconnect elements of said second electrode patterns;

connecting a first termination to said lateral resistive layer to thereby establish an electrical connection between said first termination and said first electrode patterns through said lateral resistive layer; and connecting a second termination to said lateral conductive layer to thereby establish a connection between said second termination and said second electrode patterns through said lateral conductive layer.

22. The method of claim 21, further comprising the steps of:

forming said first and second electrode patterns in generally identical form;

forming said first and second electrode patterns so that each comprises a substantially rectangular configuration having two interconnect elements protruding from one side, one of which is said first interconnect element, and having said second interconnect element protruding from essentially the midsection of a side which is opposite to said one side; and interleaving said first and second electrode patterns together so that said second interconnect elements of said first electrode patterns protrude in essentially the opposite direction relative to said second interconnect elements of said second electrode patterns.

* * * * *